United States Patent Office 2,754,659
Patented July 17, 1956

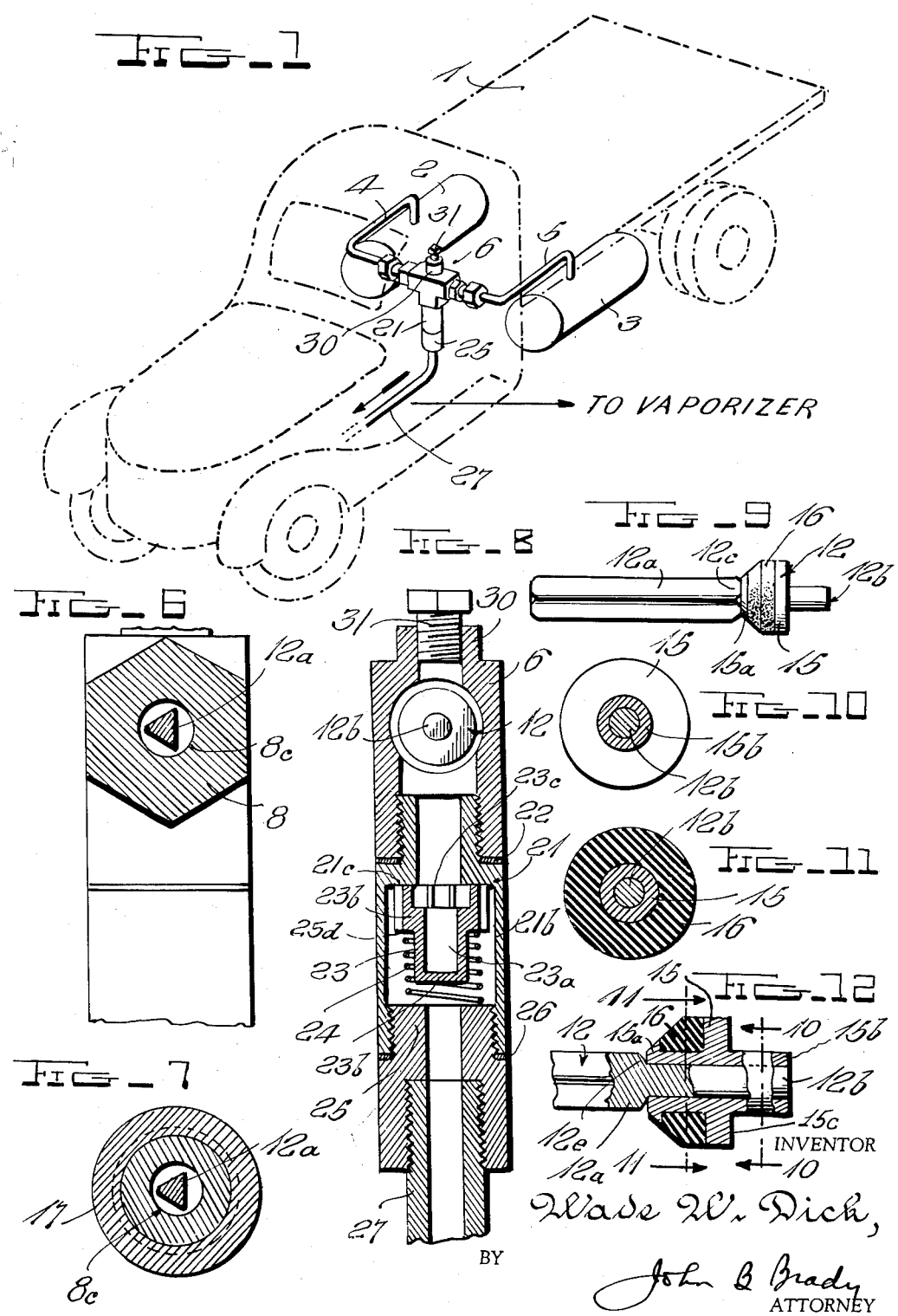

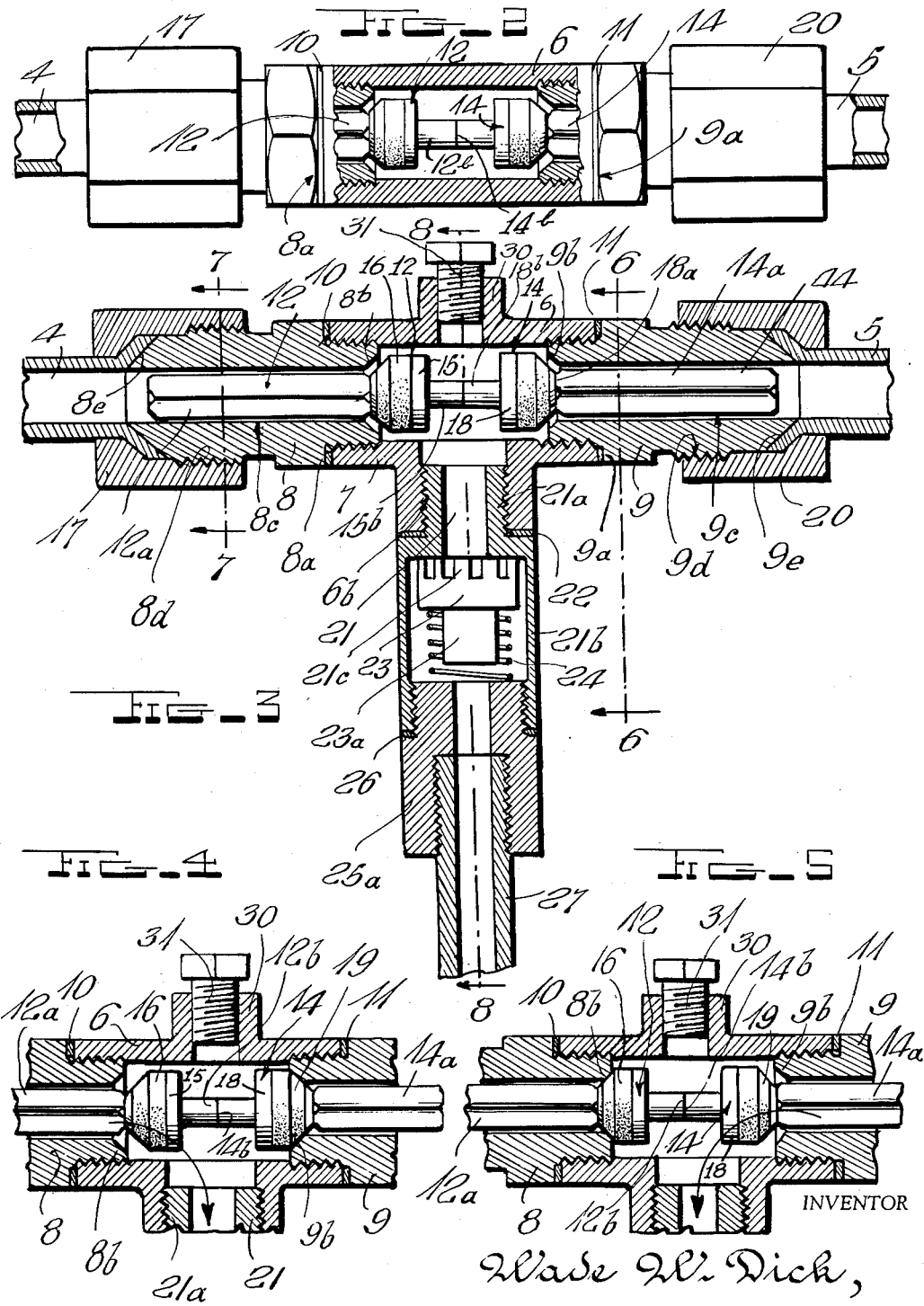

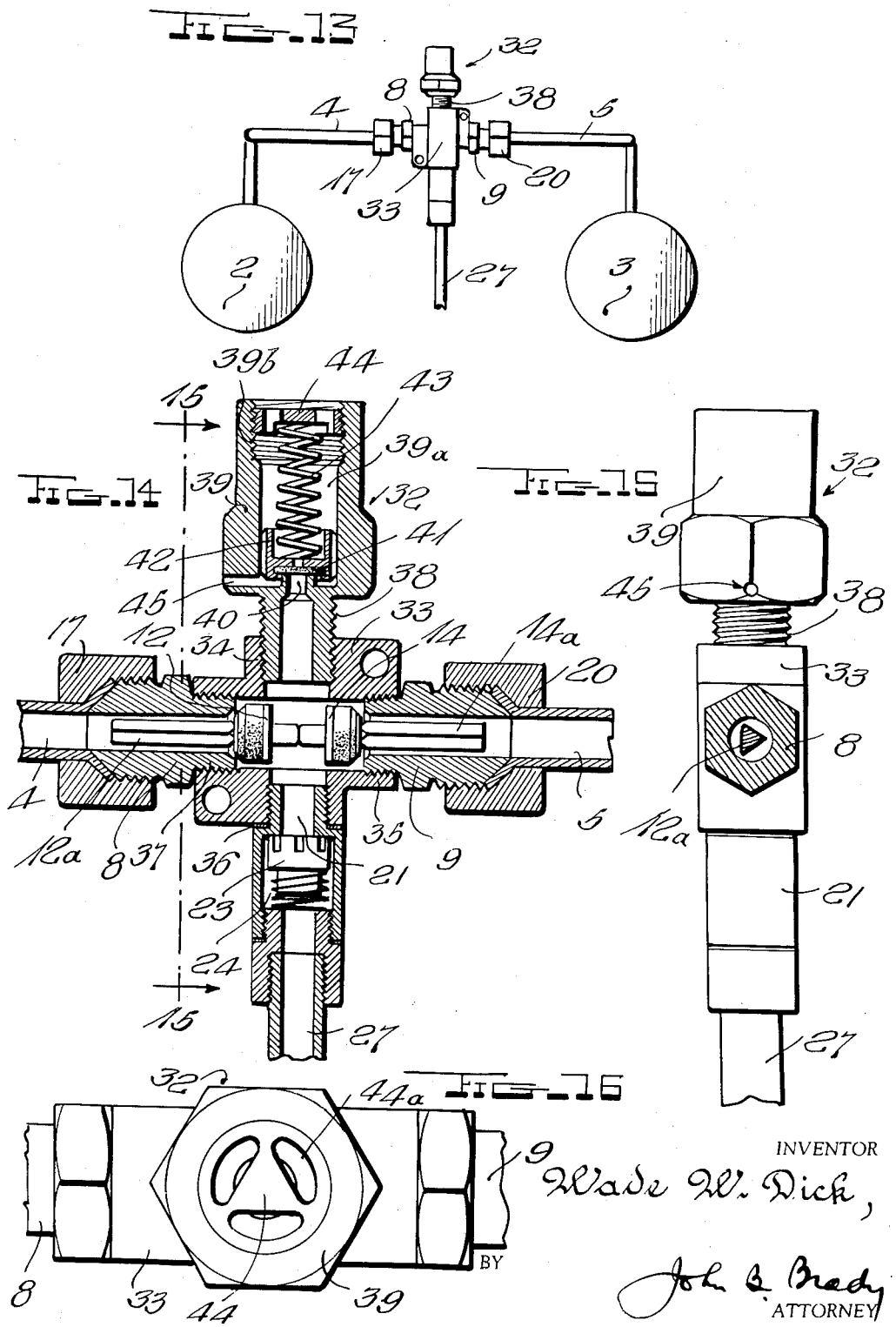

2,754,659

BALANCED VALVE FOR DISTRIBUTING LIQUID FUEL

Wade W. Dick, Shreveport, La.

Application November 28, 1952, Serial No. 322,897

3 Claims. (Cl. 62—1)

My invention relates broadly to a system for controlling the distribution of liquid petroleum and more particularly to a method and apparatus for distributing liquid petroleum on butane-propane powered vehicles.

One of the objects of my invention is to provide a method and apparatus for supplying liquid petroleum to a butane-propane powered vehicle from separate fuel tanks carried by the vehicle and subject to injury and damage and differential operation normally encountered in vehicular operation.

Another object of my invention is to provide a method of distributing liquid petroleum and/or automatically cutting off the liquid petroleum in a butane-propane powered vehicle from fuel tanks carried in saddle fashion on the vehicle chassis and subject to injury and damage by sideswiping on the highways under speeding traffic conditions.

Still another object of my invention is to provide a construction of twin check safety T interconnected between a pair of liquid petroleum fuel tanks and the carburetor system of a vehicle engine for automatically equalizing the flow of liquid petroleum from the two tanks and/or cutting off the flow of liquid petroleum from one of the tanks when the pressure in said tank is reduced for thereby preventing wasting away of the liquid petroleum.

Still another object of my invention is to provide a construction of twin check safety T interposed between a pair of liquid petroleum tanks and the carburetion system of a vehicle engine which automatically governs the supply of fuel to the carburetion system from the tank having the higher pressure which is fed from the said tank until the pressure level of the coacting tank is reached, whereupon an even flow of fuel is supplied from both tanks for thus preventing power loss from vapor pressure accumulated in a tank which has become depleted of liquid petroleum first.

Still another object of my invention is to provide a construction of twin check safety T interposed between a pair of liquid petroleum fuel tanks and the fuel supply line leading to the carburetion system of a vehicular engine, whereby excessive flow of liquid petroleum may be automatically locked off and wastage of the liquid petroleum with the inherent hazards incidental thereto prevented.

A still further object of my invention is to provide an arrangement of relief valve associated with a twin check safety T which may be installed in the fuel distribution line leading from a pair of liquid petroleum fuel tanks, the relief valve providing protection against injury due to excessive pressure which may develop in the distribution system.

Other and further objects of my invention reside in a construction of liquid petroleum twin check safety T for multiple tank fuel supply systems, as set forth more fully in the specification hereinafter following, by reference to the accompanying drawings, in which:

Figure 1 is a perspective schematic view illustrating the assembly of a twin check safety T embodying my invention in a multiple tank fuel system of a vehicle; Fig. 2 is a top plan view of the twin check safety T fitting of my invention partially broken away and illustrated in section and showing the coaction fuel supply lines and the arrangement of the coacting check valves, the check valves being shown in a balanced position for the equal feeding of fuel from both supply lines to the carbureter feed line; Fig. 3 is a vertical sectional view taken through the twin check safety T of my invention with certain of the parts illustrated in elevation, the coacting valves being shown in pressure-balanced position for equalizing the flow of fuel from the two supply tanks to the carburetion supply line; Fig. 4 is a fragmentary vertical sectional view similar to the view shown in Fig. 3 but illustrating a condition where the pressure in the left-hand fuel supply tank exceeds the pressure in the right-hand fuel supply tank, whereupon the right-hand tank is automatically cut off by the displacement of the left-hand check valve; Fig. 5 is a view similar to the views shown in Figs. 3 and 4 but illustrating the condition where the pressure in the right-hand tank has risen to a level exceeding the pressure in the left-hand tank, whereupon the left-hand tank is automatically cut off and the fuel to the carburetion supply line fed from the right-hand tank; Fig. 6 is a vertical sectional view taken on line 6—6 of Fig. 3; Fig. 7 is a vertical sectional view taken on line 7—7 of Fig. 3; Fig. 8 is a vertical sectional view taken on line 8—8 of Fig. 3; Fig. 9 is a side elevational view of one of the completely assembled check valves used in the twin check safety T of my invention; Fig. 10 is a transverse sectional view through the check valve taken on line 10—10 of Fig. 12; Fig. 11 is a transverse sectional view taken on line 11—11 of Fig. 12; Fig. 12 is a fragmentary cross-sectional view illustrating the manner of assembling the parts of the check valve used in the twin check safety T; Fig. 13 is an elevational view showing the double tank installation and the fuel supply lines extending therefrom to the check valve system of my invention and illustrating particularly the pressure relief valve in position on the T-shaped member; Fig. 14 is a vertical sectional view taken through the check valve system and the pressure relief valve associated therewith in accordance with the form of my invention shown in Fig. 13; Fig. 15 is a vertical sectional view taken on line 15—15 of Fig. 14; and Fig. 16 is a top plan view of the pressure relief valve in position on the T-shaped fitting as shown in Figs. 13–15.

My invention is directed to equipment for the successful transportation of tanks of butane-propane and other fuels where a symmetrical arrangement of tanks is provided on the transporting vehicle. I provide a pair of fuel tanks connected through conduits leading to a special fitting from which the fuel is supplied to the equipment.

The special fitting of my invention consists of two opposed valves which are arranged in such manner as to equalize the flow of LP gas from both saddle tanks, and at the same time providing a positive shut-off from either direction due to either the conduit or fuel line becoming broken or the opposing motor field tank becoming damaged. In present installations, where there are two saddle tanks used and one tank becomes damaged or the fittings become damaged due to highway accidents, the opposing tank, if turned on, will continue to flow through the damaged tank, thus creating extreme hazard on the highway and at the same time completely exhausting all fuel from both tanks. In my structure, however, the opposing valve automatically shuts off and permits the vehicle to continue using fuel from the undamaged tank, thus permitting the vehicle to proceed down the highway or into a less hazardous area where fuel from the damaged tank is being uncontrollably expended to atmosphere, creating a substantial hazard to passing traffic.

The structure includes two coacting check valves having oppositely directed stems, one portion of which serves as a centering means and guide and the other portion of which serves as an abutment means with respect to a complementary portion on the opposed valve. These abutting stems are proportioned so that displacement of one of the opposed valves will effect displacement of the opposite valve.

The tolerances to effect this coaction are very precise and require the linear dimensions of the coacting stems to be so selected that one valve is moved to closed position while the other valve is displaced to open position. The displacement is effected whenever there is a slight differential pressure developed between the tanks.

I am aware that in vapor gas systems it has been proposed to utilize diaphragm-actuating devices in the dispensing of liquefied gas from two containers for obtaining substantially continuous flow. Such diaphragm devices are not applicable for the dispensing of low pressure liquid fuels, or liquid petroleum gas in its liquefied state. Such fuels have characteristics which render diaphragm-operated devices, as distinguished from the coacting check valve system of my invention, wholly impracticable. The impracticability arises from the characteristic conditions which exist in the transporting and utilization of liquid petroleum gas as an engine fuel.

The system of my invention is designed to provide means for interrupting the flow of liquefied or LP gas in its liquid form from an undamaged tank or line to a damaged tank or line. There can be no cross-flow to a damaged tank or line. The fact is well established that diaphragms or diaphragm-actuated valves will become frozen due to the refrigerating action of LP gas in its liquid form when a regulator is not provided with a source of heat such as engine cooling water as is the case in most trucks and industrial engines. In butane-propane fuel systems, a condition exists where the liquid gas is transmitted by its own vapor pressure from the tanks through a conduit to an LP gas filter. The liquid gas then enters the primary regulator in what is commonly called a vaporizer-regulator unit, or converter. The primary regulator is heated by water from the engine cooling system and the B. t. u. transferred from the engine water to the liquid gas converts the liquid into a vapor usable as an engine fuel. This vapor is then transmitted through the secondary or atmospheric regulator, embodied in the vaporizer or converter, to the carbureter on the engine. The primary regulator reduces the tank pressure to the designed operating pressure limits of the secondary regulator. The secondary regulator performs the function of a fuel regulating device which provides the correct amount of fuel at varying engine requirements. There are several vaporizer-regulator units marketed today and the primary pressure varies to some extent, although the vaporizer-regulator and the associated units perform similar functions.

Most vaporizer-regulators operate at a primary pressure of between 4½ to 12 lbs. For example, the Algas No. 1500 converter operates on a primary pressure of 12 lbs. while the Ensign Model R vaporizer-regulator operates at 4½ lbs. and other vaporizer-regulators of other makes operate at pressures intermediate these limits. Actually the primary regulator supplies a constant pressure to the secondary regulator, such as a fuel pump would provide to a gasoline carbureter; and a secondary regulator performs basically the same function as the conventional float and needle valve assembly in a gasoline carbureter. Actually the secondary regulator itself provides varying degrees of gas according to engine requirements. A condition exists in systems of the type to which my invention is addressed where the liquid LP gas fuel, the diaphragm-operated changeover valve, would be highly impracticable when used with LP gas in its liquid state, because the large amount of liquid gas passing through the diaphragm-operating device would rapidly become frozen for this reason: LP gas has a latent heat of vaporization of approximately 900 B. t. u.'s per gallon and the housing of the diaphragm change-over valves would necessarily have to be provided with heat from some source to keep the same from becoming refrigerated. It is true that a very small amount of liquid gas might, under certain atmospheric conditions, obtain heat from the regulator housing for vaporization, but this condition would not exist where large amounts of liquid gas are passing through the regulator. LP gas absorbs heat from the atmosphere. The boiling point of propane is minus 44° F. while that of butane is plus 32° F. Varying vapor pressures are encountered. Propane has a vapor pressure of 170 lbs. p. s. i. at 100° F., although not in the direct rays of the sun. Butane has 57 lbs. vapor pressure at 100° F.

The system of my invention is subjected to variations in pressure from approximately 20 lbs. to 200 lbs. p. s. i. Where diaphragm structures are involved, such a variation would require the association of heating equipment therewith to prevent freezing which becomes wholly impracticable.

By use of the check valve system of my invention, this temperature condition does not influence the operation of the valves. Moreover, diaphragms are subject to rupture, and in systems employing pairs of diaphragms, the rupturing of this diaphragm will impair the operation of the other diaphragm.

Referring to the drawings in detail, reference character 1 designates a butane-propane powered vehicle carrying a pair of saddle tanks 2 and 3 connected through fuel supply lines 4 and 5 with the twin check safety T shown at 6. The twin check safety T includes a T-shaped member 7 internally screw-threaded at each of the ends thereof. The horizontally extending ends of member 7 receive the externally screw-threaded tubular members 8 and 9 which establish liquid- and gas-tight connection with the horizontally extending internally screw-threaded ends of the member 7 through sealing gaskets 10 and 11. The tubular members 8 and 9 are very precisely formed and entry of the externally screw-threaded ends thereof into the internally screw-threaded horizontally extending portions of members 7 are limited by abutment of flanges 8a and 9a thereon with the ends of the T-shaped member 7 through sealing gaskets 10 and 11 for presenting annular frusto-conical seats 8b and 9b in positions within the T-shaped member 7 for coaction with the twin check valves shown at 12 and 14. The twin check safety valves 12 and 14 are of identical construction as shown more clearly in Figs. 9–12 and there are no rights and lefts. The check valve 12, for example, is formed by lineally extending body structure 12a of transverse angular section as shown more particularly in Fig. 7 which extends approximately 75% of the length of the body structure while the balance of the length of the body structure is of circular section as indicated in 12b in Figs. 9–12. The portion of the body structure of circular section provides a support for the annular member 15 centrally apertured for the insertion of the portion of cylindrical section 12b therethrough. The annular member 15 is provided with a flange 15a thereon which abuts with the shoulder 12c intermediate the triangular-shaped section 12a of the body structure and the cylindrical-shaped section 12b of the body structure, at which time the sleeve portion 15b of member 7 terminates in a plane coincident with the plane of the end 12b of the body structure 12. The member 15 is swaged on the body structure 12 to insure a tight grip between annular member 15 and body structure 12. The annular member 15 has a central circular flange 15c thereon spaced from the flange 15a, and between flanges 15a and 15c there is disposed a soft annular gasket 16 formed from such material as neoprene or hycar shaped in a frusto-conical manner to effect a tight seal with respect to the frusto-conical valve seat 8b. The triangular-shaped cross-sectional portion of the body structure at 12a extends through substantially the entire length of the cylindrical bore 8c of the tubular member 8, whereby the body structure 12 is guided therein, as represented more clearly in Figs. 3, 6 and 7, by substantially tangential contact between the edges of the triangular-shaped section 12a and the interior wall of the bore 8c.

The exterior end of the tubular member 8 is screw-threaded, as represented at 8d, for receiving the internally screw-threaded coupling sleeve 17 which secures the flared end of the supply line 4 over the tapered annular end wall 8e of the tubular member 8 in sealing relation. A similar connection is made between supply line 5 and the end of tubular member 9, and for purposes of simplification, I have applied corresponding reference characters to the component parts of tubular member 9 and to corresponding parts of check valve 14 to make it clear that the twin check safety T is symmetrically constructed. That is to say, tubular member 9 has a cylindrical bore 9c extending therethrough serving as a guide for the lineally extending body portion 14a of the check valve 14. The check valve 14 supports annular member 18 which terminates in the flange 18a at one end and the flange 18c at the other end between which the soft sealing gasket 19 is supported. Gasket 19 seats against the frusto-conical seat 9b of tubular member 9 in accordance with the displacement of the twin check valve 14. The internally screw-threaded coupling sleeve 20 engages the external screw threads 9d on the end of tubular member 9 and clamps the flared end of the supply line 5 against the tapered annular end wall 9e of the tubular member 9 for a tight seal therewith. The twin check valves 12 and 14 coact with each other in a very precise manner by reason of the contacting relationship of the inner ends of the circular sections 12b and 14b and the surrounding sleeves 15b and 18b, respectively. The concentric portions 12b and 15b and the concentric portions 14b and 18b project inwardly from the annular members 15 and 18, respectively, and abut with each other when the pressure in tanks 2 and 3 is equalized. The flow from both tanks 2 and 3 is equalized under these conditions, as pictured in Figs. 2 and 3. The twin check valves 14 and 15, however, are free for independent individual movement, and where pressure conditions in tank 2 exceed the pressure conditions in tank 3, the projections 12b and 15b associated with check valve 12 are displaced to the right closing the flow path between check valve 14 and supply line 5 and more widely opening the flow path from supply line 4 with respect to check valve 12, permitting the passage of fuel from tank 2 into the fuel delivery line leading to the carburetor through fitting 21, as shown in Fig. 4. The fitting 21 has an externally screw-threaded terminus 21a thereon which engages internal screw threads 6a on the fitting 6 and effects a tight connection therewith through sealing gasket 22. The fitting 21 includes a hollow cylindrical portion 21b connected with the terminus 21a and serving as a housing for the flow check valve 23.

The flow check valve 23 shown more particularly in Fig. 8 is provided with an internal cup-like portion 23a terminating in a flange 23b having a multiplicity of vertically extending spaced stop members represented at 23c which abut with the annular shoulder 21c of the fitting 21 under the continuous urging of coil spring 24 which is seated against the end of tubular member 25 that is screw threaded into the fitting 21. A gasket 26 serves to insure a tight seal between tubular member 25 and fitting 21. The fuel delivery pipe 27 extends from the tubular member 25 to the carburetion system of the vehicle. The coil spring 24 surrounds the cylindrical exterior of the cup-like portion 23a of the check valve 23 and bears against the shoulder 23d of the check valve for yieldably maintaining the check valve in a position in which the fuel may pass to the carburetion system under all normal conditions of flow. However, should the fuel line 27 become broken, the excess flow which is developed moves the flow check valve 23 due to the velocity of flow and the reduction of pressure on the down-stream side of the excess flow check valve to a position in which the solid section end 23e of the flow check valve 23 is seated on the open port 25a of the tubular member 25 for closing off the fuel flow for preventing loss of the fuel.

The twin check safety T of my invention is dynamic in its operation and may variously occupy the three different positions illustrated in the drawings at Figs. 2 and 3 or the condition shown in Fig. 4 or the condition shown in Fig. 5, depending upon the balanced condition of fuel feed where an equalizing flow is obtained from both tanks 2 and 3 secured by the condition illustrated in Figs. 2 and 3 where the flow occurs simultaneously from both fuel tanks by reason of the open position of both check valves 12 and 14; or the condition illustrated in Fig. 4 where the projecting stem 12b of the check valve 12, with the concentric sleeve 15d thereover, has displaced check valve 14 to the right in a position in which the gasket 19 carried thereby is seated against the annular tapered seat 9b of the tubular member 9 closing off the supply of fuel from tank 3 while feeding the carburetion system wholly from tank 2; or the condition illustrated in Fig. 5 may exist in which the projecting portion 14b of check valve 14, and the sleeve portion 18b associated therewith, may displace valve 12 by contact with projecting portion 12b and sleeve portion 15b thereof to the left, effecting a seal between gasket 16 and annular tapered seat 8b of tubular member 8 whereby flow of fuel from tank 2 is wholly cut off and the carburetion system is fed wholly from tank 3 in view of the opening provided between tapered seat 9b and the gasket 19 of check valve 14.

The T-shaped member 7 is provided with a centrally disposed internally screw-threaded upwardly projecting sleeve 30 in the top thereof aligned with the depending portion of the T-shaped member. The internally screw-threaded upwardly projecting sleeve 30 receives the screw-threaded plug 31 which normally closes the T-shaped member. This plug is removable for the purpose of installation of a pressure relief valve for protecting the distribution system against the building up of excess pressure and avoiding injury to the fuel tanks and fuel distribution lines leading therefrom.

In the modified form of my invention, illustrated in Figs. 13–16, I have shown the pressure relief valve 32 installed in position. In this arrangement the central portion of the fitting is formed by a body portion 33 having four screw-threaded openings shown at 34, 35, 36 and 37. The tubular members 8 and 9, explained in connection with Figs. 1–12, are screw-threaded into openings 35 and 37 and sealed with suitable gaskets not shown and serve as connections for the fuel supply lines 4 and 5 arranged as heretofore explained in connection with the form of my invention shown in Figs. 1–12. The tubular members 8 and 9 provide guides and seats for the twin check valves 12 and 14 as heretofore explained. The top and bottom interiorly screw-threaded openings 34 and 36 provide connection means for the pressure relief valve 32 and the fitting 21, respectively, as heretofore explained.

The pressure relief valve 32 includes a screw-threaded tubular portion 38 which engages the internal screw threads 34 in the fitting 33. The screw-threaded tubular portion 38 connects to the cylindrical body portion 39 of the pressure relief valve which includes an interior upwardly projecting annular seat 40 against which the disc valve 41 carried in the cylindrical guide sleeve 42 is mounted. The cylindrical guide sleeve 42 is slidable within the interior cylindrical portion 39a of the body portion relief valve 39 and is spring loaded by spring 43 which presses the cylindrical guide sleeve 42 toward the seat 40 for maintaining the disc valve 41 into seating engagement with seat 40. The tension of spring 43 is adjustable by adjusting the screw-threaded head 44 within the interior screw threads 39b on the body portion 39 of the relief valve. A suitable tool may be gripped in the apertures 44a of head 44 for revolving the head clockwise or counterclockwise and adjusting the effective tension of spring 43. A pressure bleeding or pressure relief port 45 is provided in one side of the body portion 39 and connects to the interior of the valve body at 39a for permitting escape of gas under accumulated pressure against the action of spring 43 under conditions in which pressure may suddenly increase in the tanks 2 and 3 or fuel supply lines 4 and 5. The tension of spring 43 is selective in order to permit reduction of dangerous pressures which would not otherwise be relieved quickly through the flow check valve 23 under tension of coil spring 24.

I have found the operation of the twin check safety T system of my invention highly practical and successful in operation, and while I have described my invention in one of its preferred embodiments, I realize that modifications may be made, and I desire that it be understood that no limitations upon my invention are intended other than may be embodied by the scope of the appended claims.

What I claim as new and desire to secure by Letters Patent of the United States is as follows:

1. A balanced valve comprising a T-shaped fitting having a central portion connected with a fuel delivery line and having a lineal portion terminating in a pair of axially aligned fittings, said fittings being connected individually with a fuel supply line, said fittings each including a lineally extending cylindrical bore and an annular valve seat on adjacent interior ends thereof, a slidably arranged check valve lineally movable with respect to each of said bores, each of said check valves having an inwardly extending axially disposed projection spaced from the interior walls of the central portion of said T-shaped fitting and displaceable in position to abut one with the other, a removable valve carried by each of said projections and coacting with the valve seats on the associated fitting, whereby displacement of one of said check valves effects a corresponding displacement of the other of said check valves, a fuel delivery line connected to a position intermediate said check valves whereby fuel may be variously supplied through either of said fittings for distribution through said fuel delivery line, and in which said slidably arranged check valves each includes a stem of substantially polygonal cross section and wherein said inwardly extending axially disposed projections have a length that is approximately 25% of the length of the stem, said projections being circular in transverse section, a shoulder intermediate said circular transverse section and said substantially polygonal section, and wherein said removable valve is constituted by a cylindrical sleeve slidable over the projection of circular transverse section to a position limited by abutment of said valve with said shoulder, said cylindrical sleeve carrying a valve gasket thereon and the cylindrical sleeve terminating coplanar with the end of said projection of circular section.

2. A balanced valve comprising a T-shaped fitting having a central portion connected with a fuel delivery line and having a lineal portion terminating in a pair of axially aligned fittings, said fittings being connected individually with a fuel supply line, said fittings each including a lineally extending cylindrical bore and an annular valve seat on adjacent interior ends thereof, a slidably arranged check valve lineally movable with respect to each of said bores, each of said check valves having an inwardly extending axially disposed projection spaced from the interior walls of the central portion of said T-shaped fitting and displaceable in position to abut one with the other, a removable valve carried by each of said projections and coacting with the valve seats on the associated fitting, whereby displacement of one of said check valves effects a corresponding displacement of the other of said check valves, a fuel delivery line connected to a position intermediate said check valves whereby fuel may be variously supplied through either of said fittings for distribution through said fuel delivery line, and in which the portion of each of said check valves which is slidable in each of said bores has a transverse section which is polygonal and contains at least three flat lineal surfaces terminating in apices located at 120 degrees from each other for forming lineal guides for each of said valve stems.

3. A balanced valve comprising a T-shaped fitting having a central portion connected with a fuel delivery line and having a lineal portion terminating in a pair of axially aligned fittings, said fittings being connected individually with a fuel supply line, said fittings each including a lineally extending cylindrical bore and an annular valve seat on adjacent interior ends thereof, a slidably arranged check valve lineally movable with respect to each of said bores, each of said check valves having an inwardly extending axially disposed projection spaced from the interior walls of the central portion of said T-shaped fitting and displaceable in position to abut one with the other, a removable valve carried by each of said projections and coacting with the valve seats on the associated fitting, whereby displacement of one of said check valves effects a corresponding displacement of the other of said check valves, a fuel delivery line connected to a position intermediate said check valves whereby fuel may be variously supplied through either of said fittings for distribution through said fuel delivery line, and in which each of said check valves includes a stem of substantially polygonal cross section and wherein said projections are circular in transverse section with a shoulder intermediate said sections and wherein said removable valve is constituted by a cylindrical sleeve slidable over the projection of circular transverse section to a position limited by abutment of said valve with said shoulder, said cylindrical sleeve including a pair of spaced flanges thereon with a gasket arranged between said flanges and providing a sealing surface, one of said flanges being smaller in diameter than the other of said flanges and wherein the flange of smaller diameter contacts the abutment provided by the shoulder intermediate the polygonal section of said stem and the circular section of said projection.

References Cited in the file of this patent

UNITED STATES PATENTS

| 235,101 | Ryan | Dec. 7, 1880 |
| 2,138,988 | Thomas | Dec. 6, 1938 |
| 2,354,286 | Whaley | July 25, 1944 |
| 2,361,866 | Norway | Oct. 31, 1944 |
| 2,641,273 | Siebens | June 9, 1953 |